(12) United States Patent
Miller et al.

(10) Patent No.: US 9,440,263 B2
(45) Date of Patent: Sep. 13, 2016

(54) MATERIAL SEPARATION AND CONVEYANCE USING TUNED WAVES

(71) Applicants: Spencer Allen Miller, Lakeland, FL (US); Reza Khoshnoodi, Lakeland, FL (US)

(72) Inventors: Spencer Allen Miller, Lakeland, FL (US); Reza Khoshnoodi, Lakeland, FL (US)

( * ) Notice: Subject to any disclaimer, the term of this patent is extended or adjusted under 35 U.S.C. 154(b) by 103 days.

(21) Appl. No.: 14/187,195

(22) Filed: Feb. 21, 2014

(65) Prior Publication Data

US 2014/0374326 A1 Dec. 25, 2014

Related U.S. Application Data (60) Provisional application No. 61/767,679, filed on Feb. 21, 2013.

(51) Int. Cl.
*B07B 13/18* (2006.01)
*B03B 5/04* (2006.01)
*B03B 13/00* (2006.01)

(52) U.S. Cl.
CPC ............. *B07B 13/18* (2013.01); *B03B 5/04* (2013.01); *B03B 13/00* (2013.01)

(58) Field of Classification Search
CPC ......... B03B 4/06; B03B 4/065; B03B 13/00; B03B 13/04; B07B 13/18; B01D 21/30; B01D 43/00
USPC .................................. 210/748.02, 748.05
See application file for complete search history.

(56) References Cited

U.S. PATENT DOCUMENTS

| | | | | |
|---|---|---|---|---|
| 4,280,823 A | * | 7/1981 | Szonntagh | B01D 15/3866 209/1 |
| 4,743,361 A | * | 5/1988 | Schram | A61M 1/36 209/1 |
| 5,148,922 A | * | 9/1992 | Marriott | B03B 13/00 209/437 |
| 5,711,888 A | * | 1/1998 | Trampler | B01D 21/283 210/748.05 |
| 6,216,538 B1 | * | 4/2001 | Yasuda | B01D 21/283 210/748.05 |
| 6,351,676 B1 | * | 2/2002 | Thomas | B03D 4/02 209/489 |
| 7,571,817 B2 | * | 8/2009 | Scott | B01D 33/0376 209/404 |
| 7,893,378 B2 | * | 2/2011 | Kenny | B03B 9/06 209/576 |
| 8,236,144 B2 | * | 8/2012 | Proudkii | B01D 17/0205 204/157.15 |
| 8,387,803 B2 | * | 3/2013 | Thorslund | B01L 3/502761 209/552 |
| 2010/0193407 A1 | * | 8/2010 | Steinberg | B01L 3/502761 209/155 |
| 2011/0262990 A1 | * | 10/2011 | Wang | B01D 21/283 435/173.9 |
| 2014/0231315 A1 | * | 8/2014 | Laurell | G01N 33/5005 209/18 |

* cited by examiner

*Primary Examiner* — Joseph C Rodriguez
(74) *Attorney, Agent, or Firm* — Cygnet IP Law, P.A.; Stephen W. Aycock II (57) ABSTRACT

Systems, methods and computer readable media for material separation and conveying using tuned waves are disclosed.

6 Claims, 13 Drawing Sheets

A – Longitudinal Direction of Wave
B – Output Device #1
C – Output Device #2
D – Output Device #3
E - Gimble

FIG. 9

A – Material Hopper
B – Fluid Nozzle
C – Ultrasonic Sensor
D – Plate
E – Adjustable Leg Height

MATERIAL SEPARATION AND CONVEYANCE USING TUNED WAVES

RELATED APPLICATIONS

This application claims the benefit of U.S. Provisional Application No. 61/767,679, entitled "Material Separation Using Tuned Waves", and filed on Feb. 21, 2013, which is incorporated herein by reference in its entirety.

FIELD

Embodiments relate generally to material separation and, more particularly, to systems and methods for separating materials using tuned waves.

BACKGROUND

In aggregate ore separation, current industry standard practices may employ chemically intensive processes and methods such as shaker tables and hammers. This may be a somewhat primitive method of trying to physically separate materials (e.g., shake out the ore). Some conventional systems may be operating within a limited range of frequency separation (via pressure disturbance through mechanical waves generated by physical contact with tables and hammers). This can result in essentially one frequency, possibly un-tuned to the objects they are attempting to separate, providing only one degree of freedom. Due to this, the efficiency and effectiveness is diluted even further when aggregate ore is presented in multiple mediums. Not only are conventional techniques more energy intensive than might be necessary and may be more water intensive, but an inability to tune frequencies to very specific ranges for most efficient separation can result in significant loss of ore that was unable to be separated at all for use.

Embodiments were conceived in light of the above-mentioned problems and limitations, among other things.

SUMMARY

Some implementations can include systems and methods for separation, stratification and/or conveyance of aggregate ore, in various mediums, by a technique of tuning a pressure disturbance known as mechanical waves. Some implementations can accomplish this without the energy intensive process of generating said waves via physical contact and also allows multiple degrees of freedom of the aggregate ore. This process may be accomplished via the configuration of relatively inexpensive existing technologies provided in an adjustable platform, that can generate the frequencies that can travel through the various mediums (air, water, etc.) being employed without the need for physical contact (and may be optionally communicated via a plate).

The process can include administering a stimulus of sound wave energy to a mixture (or matrix) of heterogeneous materials, then exploiting the differences in the individual motive response values of material types. The stimulation control values (or parameters) can be altered to promote the greatest differential in response values between different material types, which can, in turn, determine the most effective physical configuration of the process hardware, and the most feasible method for final mechanical separation. Differences in material types to be separated, size to be separated, rate of separation, conveyance needs or the like, all have notable impacts on the overall settings, configuration and physical appearance of the separation equipment and scale, but the process itself may be similar.

Process settings (or parameters) can include number of output devices, power output, frequency, amplitude, signal duration, and phase of output signal to each device, physical orientation of output devices, angle of incidence of each output device to a plate, plate type/configuration (e.g., plate material, plate thickness, plate type or the like), inclination angles of two axis of the apparatus, and, in the case of wet separation, evacuation fluid flow rate, pressure, and direction of fluid flow. The frequencies/wavelengths being generated can then be tuned to specific ranges, based on the reactions of materials to be separated. Materials of different types may have differences in measurable response values. The simulation can be modified in order to create the greatest differential between response values, which will determine the optimal settings, scale, and configuration of system hardware. Differences in material types, size, and rate of separation, as well as moisture content, will have notable impacts on the above-mentioned parameters, but the process will be similar. Process settings can include number of output devices, frequency, amplitude, phase of output signal, duration of output signal, physical orientation of output devices, two axis of inclination of plate, and in the case of wet separation, fluid flow rate, pressure, and direction of fluid flow. Some implementations may also include automated changes in process control points based either on elapsed time, or feedback from sensory devices. Some implementations may include "pinging" the resonant frequency of the materials. The principal behind this process is that any object when sharply struck, or in this case pinged, will emit its own resonant frequency. Therefore, objects of varying make-up may emit varying frequencies.

By pinging objects with frequencies tuned for their specific make-up, the frequency emissions of objects can now be maintained. When more than one material type is being separated, as with aggregate ore, each individual material type is being continually pinged so as to cause that material to resonate at its corresponding individual resonant frequency. This can cause each material to naturally fall into its respective bandwidth. A material, upon receipt of a concussive strike, will emit a resonant frequency, possibly unique to that material type. Material characteristics (e.g., density, size, weight, surface texture, or the like) may define or influence material measurable response values. These response values may then be used to determine the optimal values of the administered process stimulation. For example, if a material has a response duration (e.g., frequency emission) of 20 milliseconds, which is to be separated from another material with a response duration value of 10 milliseconds, then a 50 Hz output signal would maintain a constant response of the first martial type, but the second material type would be in an unresponsive state for 10 ms, then in a responsive state for 10 ms. This causes the stratification of any aggregate ore for purposes of claiming or reclaiming ore materials that current industry standard methods may have not addressed in an efficient or cost productive manner.

The principal behind this process is that any object when sharply struck, or in this case pinged, will emit its own resonant frequency. Therefore, objects of varying make-up may emit varying frequencies. By pinging objects with frequencies tuned for their specific make-up, the frequency emissions of objects can now be maintained. When more than one material type is being separated, as with aggregate ore, each individual material type is being continually pinged so as to cause that material to resonate at its corresponding individual resonant frequency. This can cause each material to naturally fall into its respective bandwidth. Frequency emission only represents one of many measurable responses having values that may change based on material properties. If the response value of material travel in height has a greater difference than the frequency emissions, then this particular response value may be targeted as it would provide the largest range between differing material reactions.

The relationship between materials may act as its own motivating force. For example, a contained mixture of same sized materials of differing densities would naturally lead to the denser material settling beneath the less dense material when exposed to vibratory motivation. However, based on process control parameters the material stratification may be reversed, if desired.

In another example, if materials of the same size are of a different shape e.g. cubes and spheres, then the cubes may agglomerate as their flat sides prohibit motion in one degree of freedom, so the spheres would be ejected from the cube agglomeration, and form an agglomeration of spheres.

In yet another example, when materials are separated based on texture, rough materials may encounter more friction than smooth materials, and may lag the smooth materials when traveling over a distance. When materials are to be separated based on size, the entire mixture itself can effectively serve as a dynamic screen, where materials pass between air gaps and result in a coarse to fine progression.

Delivering multiple frequencies at once can add multiple degrees of freedom. For example, this can be observed as stratification of materials by type. Once stratified, the materials can then be mechanically separated.

Some implementations can include a system comprising a controller programmed to separate materials using tuned waves, and an input device configured to measure material response to stimulation. The system can also include an output device configured to generate tuned waves based on one or more control signals received from the controller.

The controller can be configured to provide independent control over output signals to each output device. The controller can be configured to control one or more of a frequency, an amplitude, signal phasing, and signal duration of the one or more control signals.

The system can further include a plate configured with a two-axis of inclination and disposed so as to communicate the tuned waves from the output devices. The controller can be further configured to control one or more of fluid flow, fluid pressure, and fluid flow direction for wet material separation/conveyance.

The controller can be configured to perform operations. The operations can include providing material via a material hopper, and configuring a controller with material separation/conveyance parameters based on one or more components of the material. The operations can also include generating, at the controller, one or more modulated signals in accordance with the parameters, each modulated signal corresponding to an output device. The operations can further include amplifying the modulated signals, and supplying the amplified modulated signals to an output device. The operations can also include causing the material to be separated in response to application of the modulated signals from the output device via a resonator plate.

The controller can be further configured to receive a feedback signal from a feedback sensor and provide the feedback signal to the controller. The controller can be further configured to adjust, with the controller, the modulated signal based on the received feedback signal.

Some implementations can include a method including providing material via a material hopper, and configuring a controller with material separation/conveyance parameters based on one or more components of the material. The method can also include generating, at the controller, one or more modulated signals in accordance with the parameters, each modulated signal corresponding to an output device. The method can further include amplifying the modulated signals and supplying the amplified modulated signals to an output device. The method can also include causing the material to be separated in response to application of the modulated signals from the output device via a resonator plate.

The method can further include receiving a feedback signal from a feedback sensor and providing the feedback signal to the controller. The method can also include adjusting, with the controller, the modulated signal based on the received feedback signal. The method can further include orienting one or more of the output devices to a predetermined angle of incidence via a gimble corresponding to each output device.

The feedback sensor can include an ultrasonic sensor. The method can also include moving each separated components of the material to a respective output chute.

Some implementations can include a nontransitory computer readable medium having stored thereon instructions that, when executed by a processor, cause the processor to perform operations. The operations can include providing material via a material hopper, and configuring a controller with material separation/conveyance parameters based on one or more components of the material. The operations can also include generating, at the controller, one or more modulated signals in accordance with the parameters, each modulated signal corresponding to an output device. The operations can further include amplifying the modulated signals, and supplying the amplified modulated signals to an output device. The operations can also include causing the material to be separated in response to application of the modulated signals from the output device via a resonator plate.

The operations can also include receiving a feedback signal from a feedback sensor and providing the feedback signal to the controller. The operations can further include adjusting, with the controller, the modulated signal based on the received feedback signal. The operations can also include orienting one or more of the output devices to a predetermined angle of incidence via a gimble corresponding to each output device.

The feedback sensor can include an ultrasonic sensor. The operations can also include moving each separated components of the material to a respective output chute.

DETAILED DESCRIPTION

In general, material separation using tuned waves can include energizing an aggregate material with a specific frequency or set of frequencies. The frequency can be determined by measuring a physical response of the aggregate material to output device stimulation and receiving the response via an electrical and/or software interface and storing the received response for integration into a final output profile of the tuned wave separation system.

An example frequency bandwidth can be on the order of less than or equal to about 200 Hz, for example. An actual bandwidth can also be determined empirically based on testing of material responses.

In operation, output device (e.g., acoustical emitter) modulation is determined by one or more software controlled output signals in accordance with the above-mentioned frequency response. Output device physical orientation can be determined by a geometric relationship between the emitter and aggregate material present for separation. For example, outputs may be phased so that no more than 120 degrees of separation will exist for any one of the emitters within the physical machine structure. Some implementations can be used to create a vortex of sound (or tuned wave energy) in order to separate aggregate material.

Figure 1:
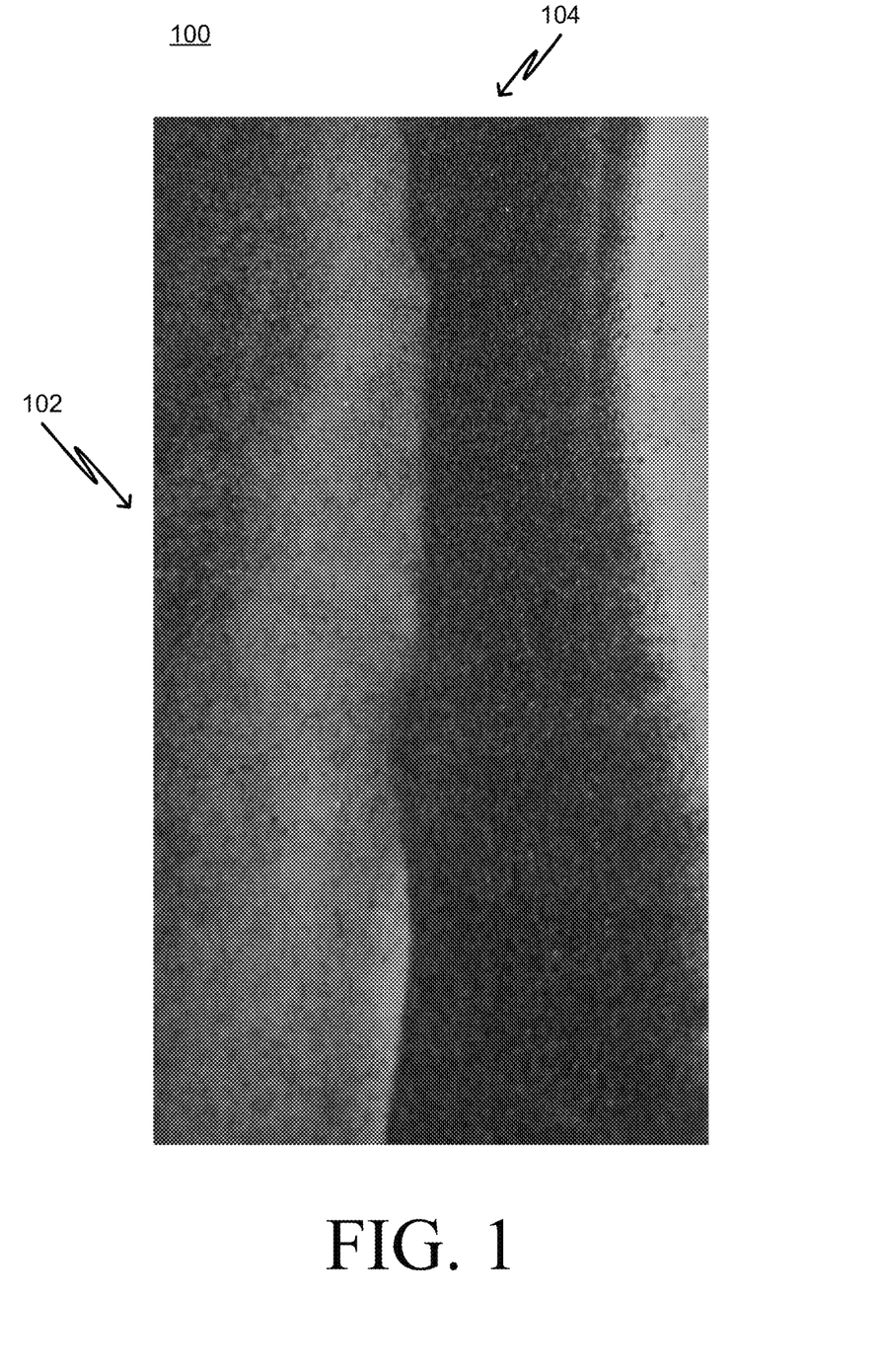
FIG. 1 is photograph of an example wet aggregate.
Figure 2:
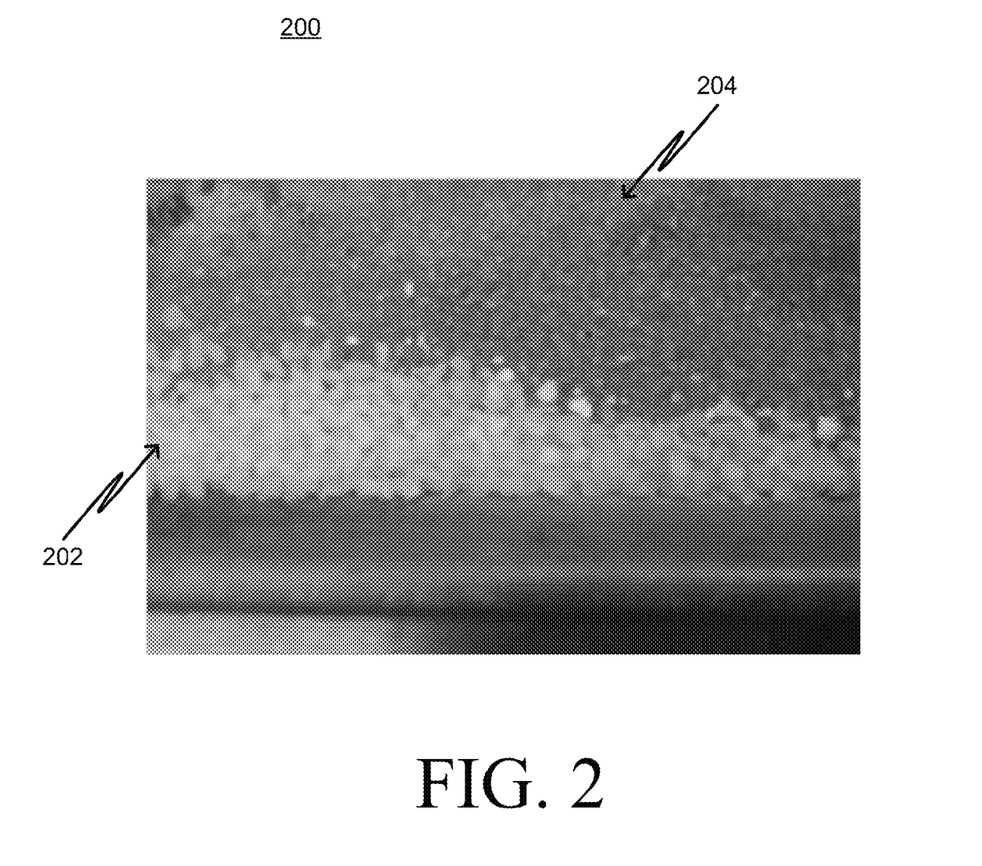
FIG. 2 is a photograph of an example dry aggregate.

FIG. 1 is photograph of an example wet aggregate 100 showing a first material portion 102 and a second material portion 104 having been separated using an embodiment of the system described herein. FIG. 2 is a photograph of an example dry aggregate 200 showing a first material portion 102 and a second material portion 104 having been separated using an embodiment of the system described herein.

Figure 3:
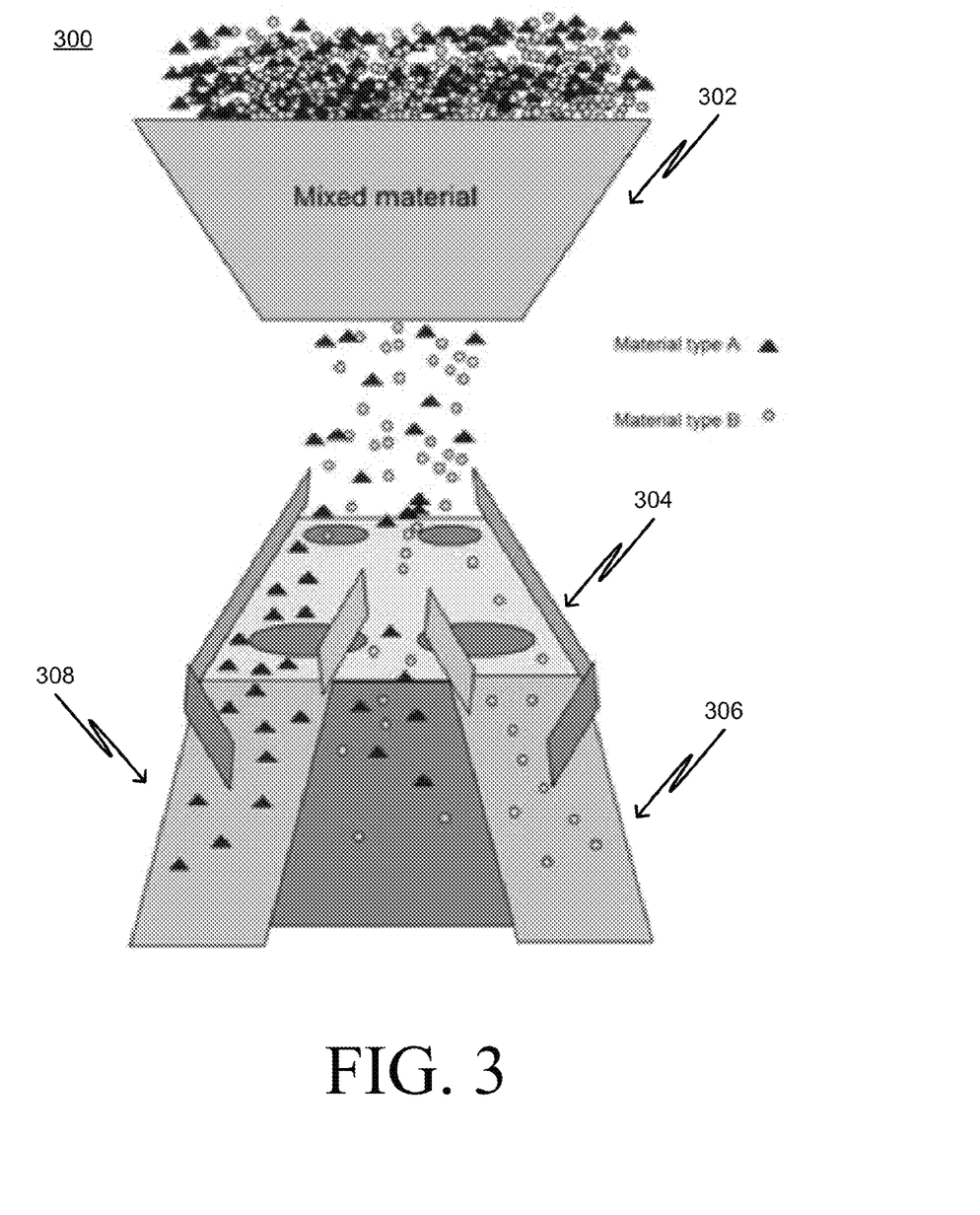
FIG. 3 is a diagram of an example system for separating materials using tuned waves in accordance with at least one embodiment.

FIG. 3 is a diagram of an example system 300 for separating materials using tuned waves in accordance with at least one embodiment. The system 300 includes a mixed material supply 302, a separator 304 including a plate and one or more tuned wave output devices, a first material chute 306 and a second material chute 308.

Figure 4:
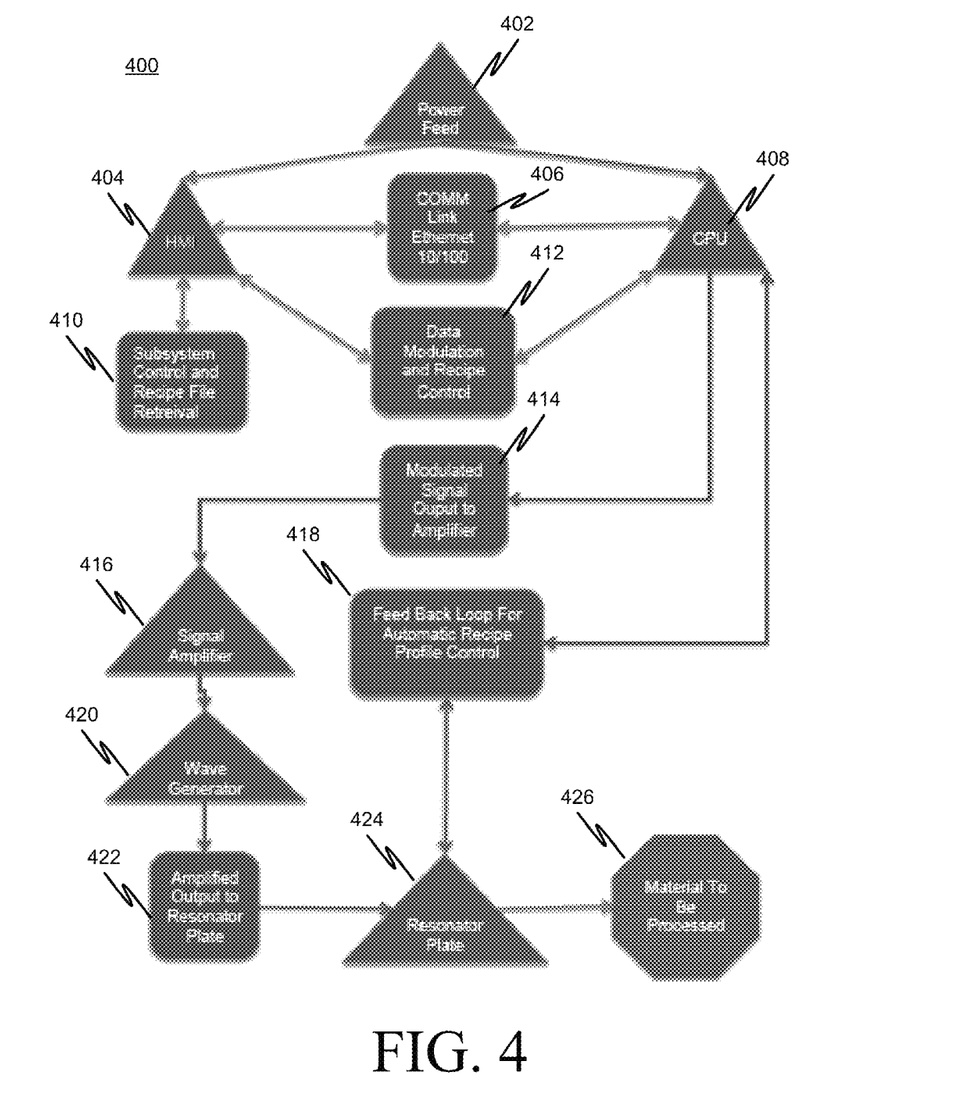
FIG. 4 is a diagram of an example system for separating material using tuned waves in accordance with at least one embodiment.

FIG. 4 is a diagram of an example system 400 for separating material using tuned waves in accordance with at least one embodiment. The system 400 includes a power supply 402, a human-machine interface 404, a communications link 406 and a central processing unit 408. The system 400 also includes a file storage/retrieval system 410 (e.g., database), data modulation and recipe parameter control module 412.

In operation, the processor 408 can output a modulated signal 414 to an amplifier 416. The amplified signal can be supplied to a wave generator 420, which can supply an amplified output 422 to a resonator plate 424 in contact with material to be separated (or conveyed) 426.

The system 400 can also include a feedback loop 418 for providing a feedback channel so that the processor can automatically adjust system parameters.

Figure 5:
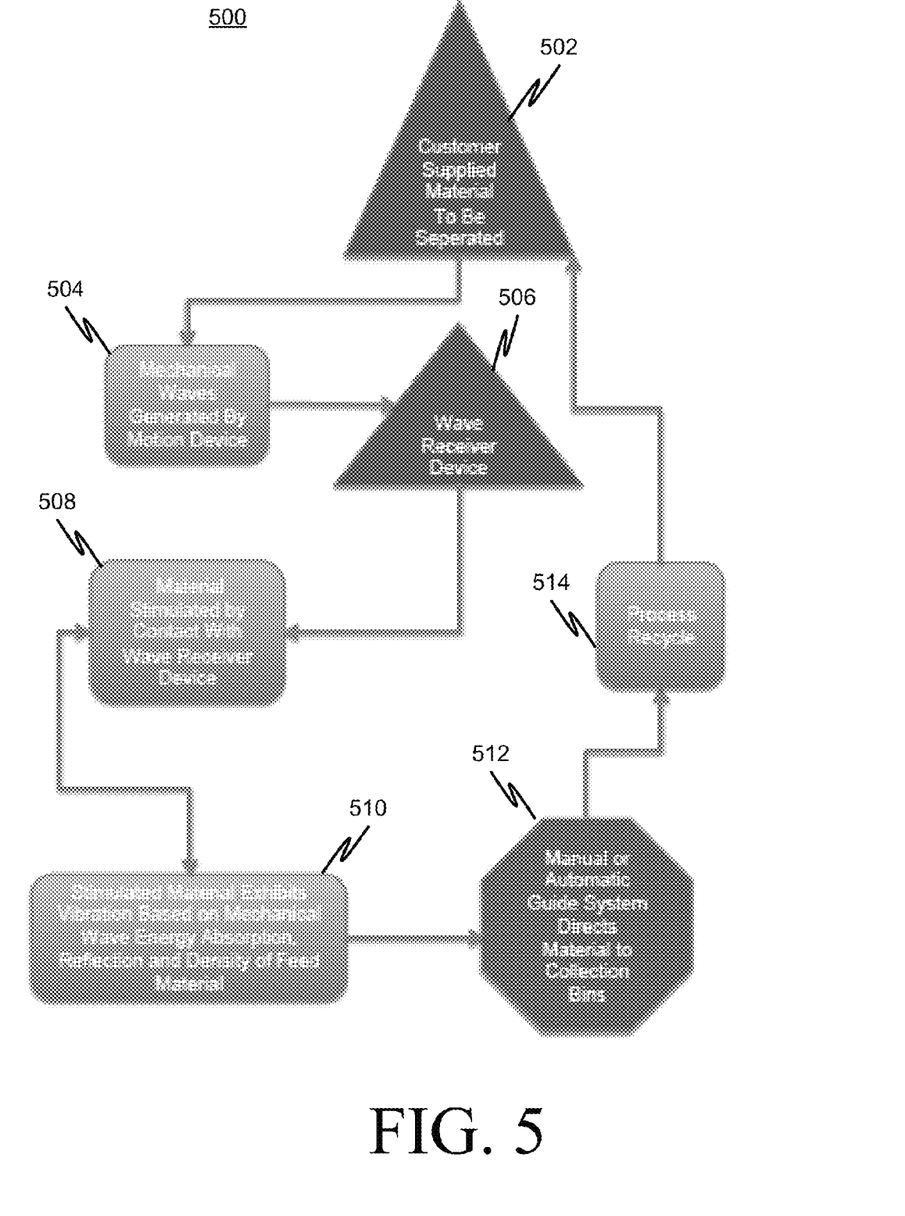
FIG. 5 is a diagram of an example process flow for separating materials using tuned waves in accordance with at least one embodiment.

FIG. 5 is a diagram of an example process flow 500 for separating materials using tuned waves in accordance with at least one embodiment. The process 500 includes providing material to be separated or conveyed 502 and subjecting the material to mechanical waves 504.

The waves are received by a receiving device 506 and used to stimulate the material 508. The stimulated material may exhibit vibration or other motion based on mechanical wave energy absorption, reflection and density of material 510. The material can be guided via a manual or automatic guide system to collection bins 512.

Figure 6:
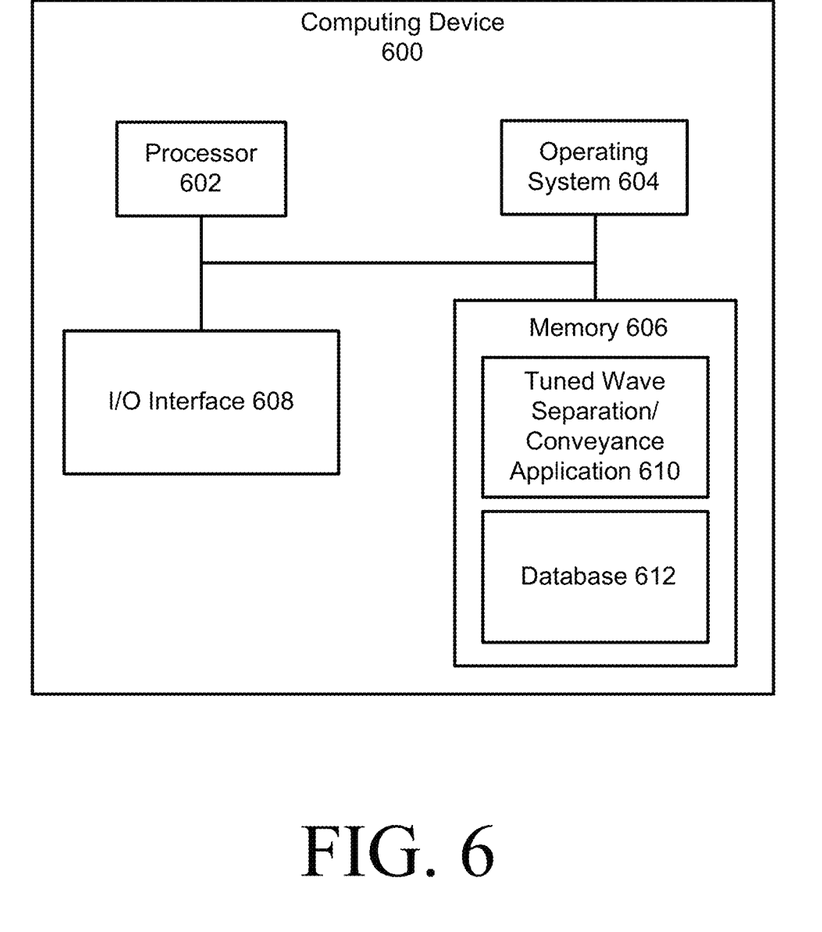
FIG. 6 is a diagram of an example computer system for material separation and conveyance using tuned waves in accordance with at least one embodiment.

FIG. 6 is a diagram of an example computing device 600 that can be configured for material separation and/or conveyance using tuned waves in accordance with some implementations. The computing device 600 includes a processor 602, operating system 604, memory 606 and I/O interface 608. The memory 606 can include a material separation and/or conveyance tuned wave application 610 and a database 612 (e.g., for storing tuned wave parameters or the like).

In operation, the processor 602 may execute the material separation and/or conveyance tuned wave application 610 stored in the memory 606. The material separation and/or conveyance tuned wave application 610 can include software instructions that, when executed by the processor, cause the processor to perform operations for material separation and/or conveyance tuned wave in accordance with the present disclosure (e.g., the material separation and/or conveyance tuned wave application 610 can perform one or more of steps 402-426 and/or 502-512 described above and, in conjunction, can access the database 612). The material separation and/or conveyance tuned wave application 610 can also operate in conjunction with the operating system 604.

Figure 7:
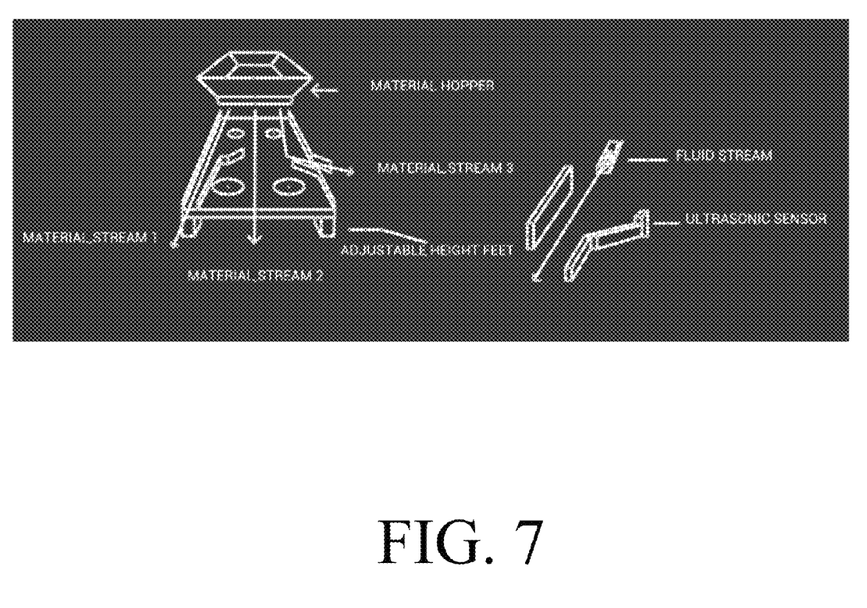
FIG. 7 is a diagram of an example system for material separation and conveyance using tuned waves in accordance with at least one embodiment.

FIG. 7 is a diagram of an example system for material separation and conveyance using tuned waves in accordance with at least one embodiment. The system includes a material hopper that feeds material onto a separation table. The material can be separated into three streams as shown in FIG. 7. The system can also include adjustable height feet. The system can include an ultrasonic sensor disposed on one or more material stream guide members.

Figure 8:
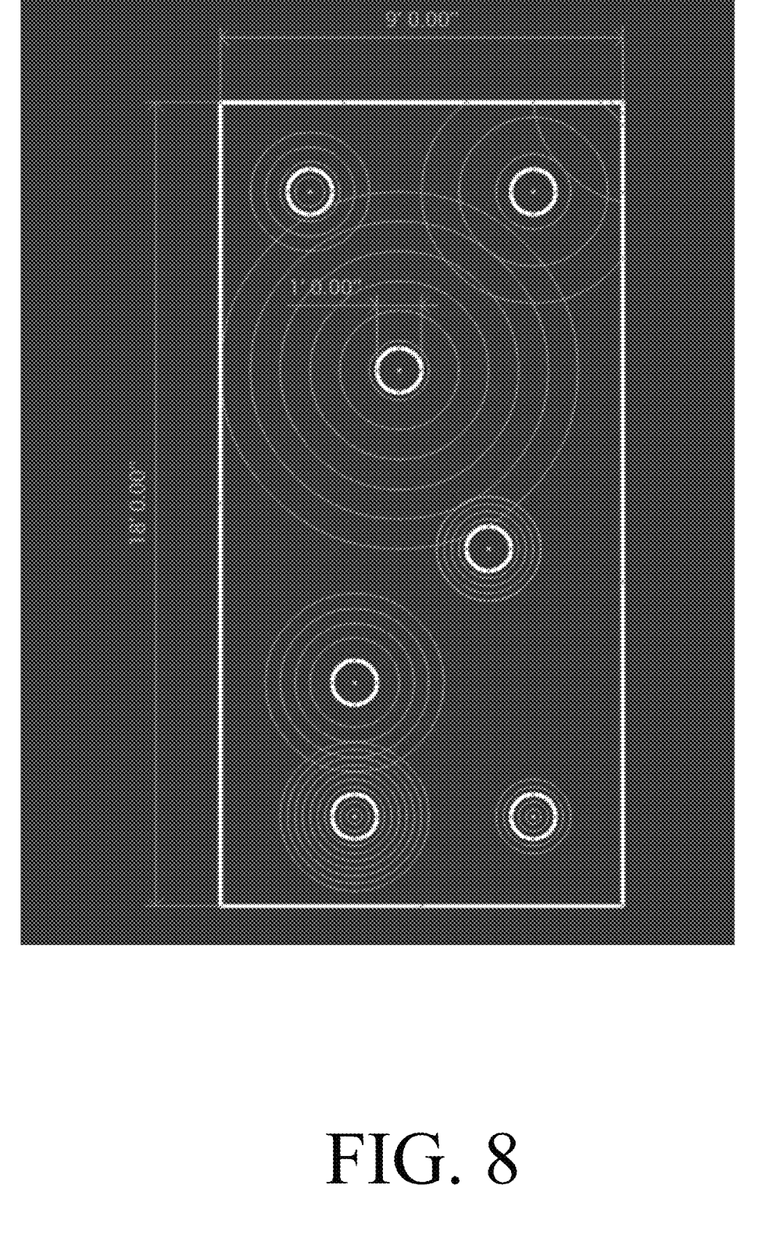
FIG. 8 is a diagram of an example output wave pattern for material separation and conveyance using tuned waves in accordance with at least one embodiment.

FIG. 8 is a diagram of an example output wave pattern for material separation and conveyance using tuned waves in accordance with at least one embodiment. The wave pattern can include a plurality of output devices generating waves at different frequencies (shown as ring spacing) and power levels (shown as ring size) as shown in FIG. 8.

Figure 9:
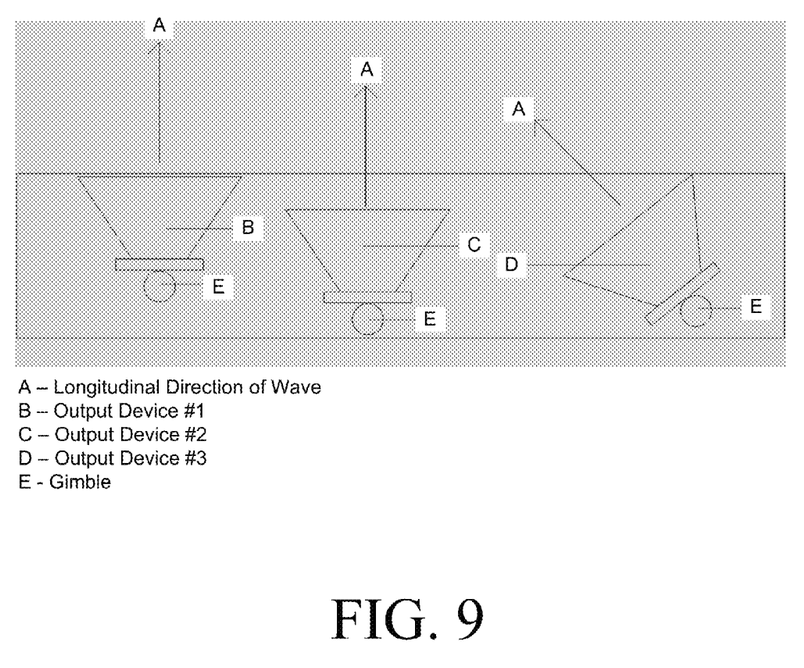
FIG. 9 is a diagram of an example system for material separation and conveyance using tuned waves in accordance with at least one embodiment.

FIG. 9 is a diagram of an example output device placement and orientation in a system for material separation and conveyance using tuned waves in accordance with at least one embodiment. Output Device #1 (B) is shown oriented generally perpendicular to the resonator plate. Output Device #2 (C) is oriented generally perpendicular to the resonator plate and spaced a distance below the plate. Output Device #3 (D) is oriented by a gimble (E) so as to have a longitudinal direction of the output wave at an angle of incidence to the resonator plate.

Figure 10:
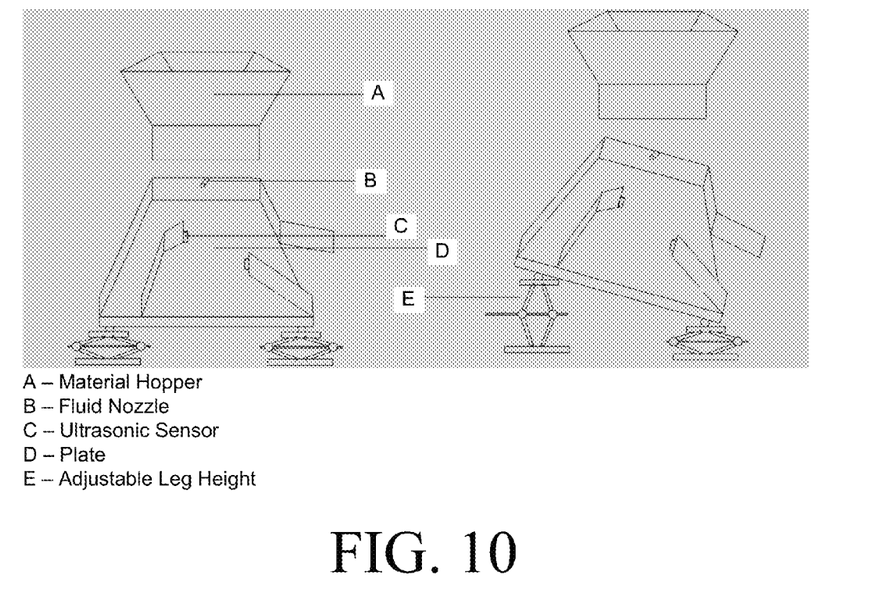
FIG. 10 is a diagram of an example system for material separation and conveyance using tuned waves in accordance with at least one embodiment.

FIG. 10 is a diagram of an example system for material separation and conveyance using tuned waves in accordance with at least one embodiment. The system includes a material hopper (A), a fluid nozzle (B), an ultrasonic sensor (C) to sense material and provide feedback to a controller, a plate (D), and adjustable legs (E).

Figure 11:
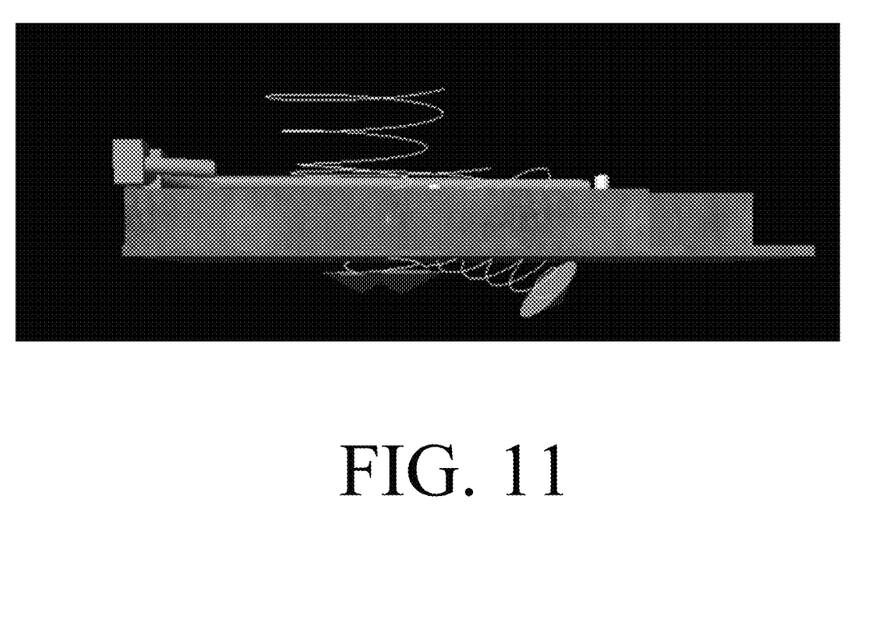
FIGS. 11-13 are diagrams showing various views of an example system for material separation and conveyance using tuned waves in accordance with at least one embodiment.
Figure 12:
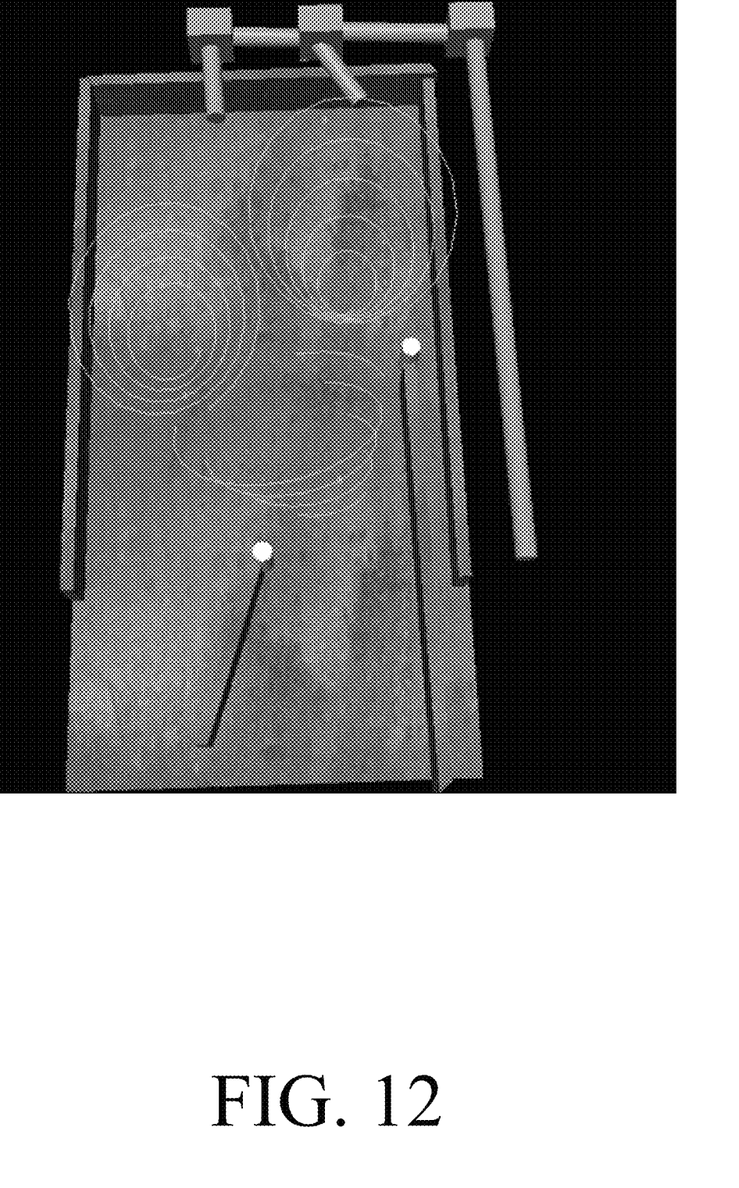
Figure 13:
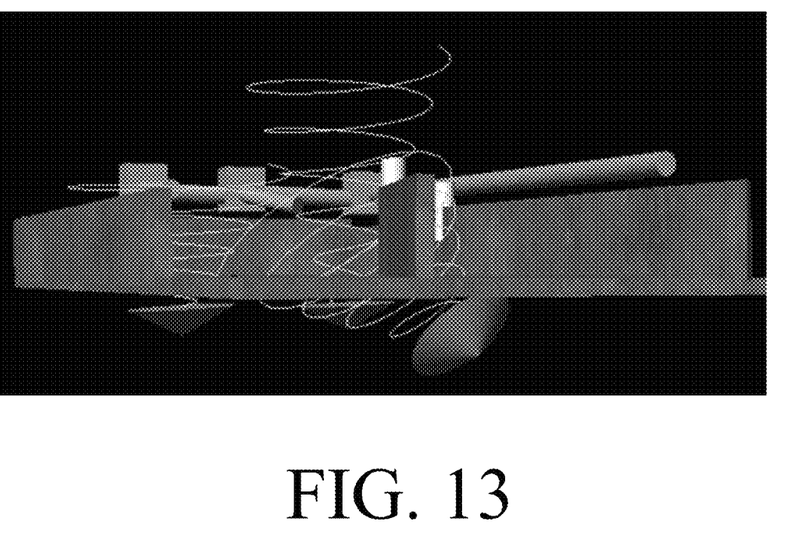

FIGS. 11-13 are diagrams showing various views of an example system for material separation and conveyance using tuned waves in accordance with at least one embodiment.

In addition to separating material, the tuned wave methods and systems described herein can be used to convey material. While examples have been described in terms of separating one or more materials from an aggregate material, it will be appreciated that other types of materials can be separated and/or conveyed using tuned wave systems and methods as described herein, such as waste streams (trash and/or recycling streams), food products, agricultural products and the like. In general any material where a need may exist to separate constituents (or convey material) may be processed using an implementation of the tuned wave separation/conveyance techniques described herein.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and material science arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for material separation and conveyance using tuned waves.

While the disclosed subject matter has been described in conjunction with a number of implementations, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system comprising:
 a controller programmed to separate materials using tuned waves;
 an input device configured to measure material response to stimulation; and
 an output device configured to generate tuned waves based on one or more modulated control signals received from the controller, wherein the controller is configured to perform operations including:
  providing material via a material hopper;
  accessing material separation/conveyance parameters based on one or more components of the material;
  generating, at the controller, the one or more modulated control signals in accordance with the parameters, the one or more modulated control signals corresponding to the output device;
  amplifying the one or more modulated control signals;
  supplying the one or more amplified modulated control signals to the output device: and
  causing the material to be separated in response to application of the one or more amplified modulated control signals from the output device via a resonator plate.

2. The system of claim 1, wherein the controller is configured to provide independent control over the one or more amplified modulated control signals supplied to the output device.

3. The system of claim 1, wherein the controller is configured to control one or more of a frequency, an amplitude, signal phasing, and signal duration of the one or more modulated control signals.

4. The system of claim 1, further comprising a plate configured with a two-axis of inclination and disposed so as to communicate the tuned waves from the output device.

5. The system of claim 1, wherein the controller is further configured to receive a feedback signal from a feedback sensor and provide the feedback signal to the controller.

6. The system of claim 5, wherein the controller is further configured to adjust, with the controller, the modulated control signals based on the received feedback signal.

* * * * *